United States Patent [19]
Ueno et al.

[11] Patent Number: 5,861,754
[45] Date of Patent: Jan. 19, 1999

[54] POSITION DETECTION DEVICE

[75] Inventors: Toshiaki Ueno, Yokohama; Takaaki Yagi; Mitsuchika Saito, both of Kawasaki, all of Japan

[73] Assignee: Hewlett-Packard Company, Palo Alto, Calif.

[21] Appl. No.: 892,733

[22] Filed: Jul. 15, 1997

[30] Foreign Application Priority Data

Jul. 22, 1996 [JP] Japan .................................... 8-191687

[51] Int. Cl.$^6$ .................................................. G01R 27/26
[52] U.S. Cl. ............................ 324/660; 324/680; 33/706
[58] Field of Search ............................ 33/1 M, 503, 700, 33/706; 324/660, 680, 686, 688

[56] References Cited

U.S. PATENT DOCUMENTS

| | | | |
|---|---|---|---|
| 3,312,892 | 4/1967 | Parnes ..................................... | 324/660 |
| 4,060,903 | 12/1977 | Ernst ........................................ | 33/706 |
| 5,461,319 | 10/1995 | Peters ..................................... | 324/660 |

FOREIGN PATENT DOCUMENTS 2311015  9/1974  Germany ............................... 324/660

OTHER PUBLICATIONS

IBM Technical Disclosure Bulletin, vol. 21, No. 1, Jun. 1978.
Physik Instrumente Catalog for "Product Micropositioning" 1996, pp. 5.15–5.17, pp. 9.2–9.4.
MTI Instruments Catalog for "AS–500–SRT Spindle Runout Test System" 1993.
Hewlett–Packard Catalog for "Complete, PC–Compatible, Closed–Loop Laser Positioning", 1993.

Uchino, Kenji, "Piezoelectric and Electrostrictive Actuator" Morikita Shuppann, pp. 94–102, 1986.

Nikkei Microdevices, Aug. 1994, p. 17.

Primary Examiner—G. Bradley Bennett
Attorney, Agent, or Firm—Ian Hardcastle

[57] ABSTRACT

A position detection device that comprises a first substrate, a second substrate, an alternating current (AC) bridge comprised of four variable capacitors, and a detection circuit. The first and second substrates have a flat first electrode surface and a flat second electrode surface, respectively. The second substrate is mounted opposite the first substrate with the first electrode surface opposite the second electrode surface and separated from the second electrode surface by a minute gap. The second substrate and the first substrate are movable relative to one another in the plane of the electrode surfaces. Each of the variable capacitors is composed of a first capacitor electrode located on the first electrode surface and a second capacitor electrode located opposite the first capacitor electrode on the second electrode surface. The capacitor electrodes of two of the variable capacitors are long capacitor electrodes, and the capacitor electrodes of the remaining two of the variable capacitors are short capacitor electrodes. The short capacitor electrodes are shorter than the long capacitor electrodes in the detection direction of the position detection device. The long capacitor electrodes located on the first electrode surface are offset in the detection direction relative to the long capacitor electrodes located on the second electrode surface. The detection circuit derives a position-indicating signal from the output voltage generated by the AC bridge. The position-indicating signal represents the relative position of the first substrate and the second substrate in the detection direction.

20 Claims, 11 Drawing Sheets

POSITION DETECTION DEVICE

TECHNICAL FIELD

The invention relates to a position detection device that may be used, for example, in connection with a high-precision positioning mechanism. More particularly, the invention relates to a positioning device that provides precise control of a positioning device for, e.g., a probe target in a scanning probe microscope, or a moving medium-type memory device.

BACKGROUND OF THE INVENTION

A typical scanning probe microscope is a device that may be used to measure the distance between the tip of a probe needle and a test sample surface, also referred to as the probe target. Such distance is determined by measuring physical quantities between the probe needle tip and the test surface. For example, the scanning probe microscope may measure the electrostatic capacitance and contact voltage between the probe needle tip and the test surface, or a tunnel current flowing through the probe needle tip and test surface. A scanning probe microscope can detect physical quantities, such as distance, in an extremely small region of the test sample surface. This region may have dimensions in the order of several nanometers.

Scanning probe microscope technology may be used in various applications. For example, a moving medium-type memory device that incorporates scanning probe microscope technology can record and reproduce one bit of information stored in an extremely small region. This region may have a diameter of about 30 nm.

In applications such as a scanning probe microscope or memory device, the probe and probe target must be capable of being positioned relative to one other with an error of less than the desired spatial resolution. For example, in a moving medium-type memory device, the probe and probe target must be positioned relative to one another with an error of less than the size of the region used to record one bit. The device must be able to position the probe or probe target with a positional error that is less than the dimensions of smallest possible region of the target surface it is desired to be resolved accurately. Accordingly, the precision with which the probe or probe target positioning is controlled affects how small a region can be accessed by such device. Moreover, since most positioning devices are closed-loop devices that include a position detection device, the accuracy with which the positioning device can position the probe target depends on the accuracy with which the position detection device can detect the position of the probe target.

In *Piezo/Electrostrictive Actuators*, pp. 94–102, Morikita Shuppan, (1990), K. Uchino disclosed various methods that can be used to implement a position detection device of the type required for positioning a probe target with a precision of the order of that described above. However, most of the devices disclosed by Uchino are physically large and therefore cannot be fabricated as part of an integrated circuit.

FIG. 1 shows a position detection device that is based upon capacitance and that can form part of an integrated circuit. A typical capacitance-type position detection device includes four capacitors that are arranged to form the AC bridge circuit 21 shown in FIG. 1. One of the capacitors forming the AC bridge circuit 21 includes the first electrode A fixed to the target stage 23, and includes the second electrode B fixed to the substrate 24 shown in FIG. 2. The electrodes A and B are oriented perpendicular to the direction of motion of the target stage. The remaining three capacitors of the AC bridge circuit are fixed capacitors. The position detection device detects a change in the relative position between the target stage and substrate from the variation in the capacitance of the capacitor formed by the electrodes A and B. Such variations in capacitance result from corresponding changes in the gap d between the electrodes A and B of the capacitor.

The differential output voltage between the output nodes of the AC bridge 21 depends on the change in the gap d between the capacitor electrodes A and B. This voltage is fed to the detection circuit 6, which includes the differential amplifier 36, the synchronous detector circuit 121 and the low-pass filter 20. The synchronous detector circuit 121 detects the amplified differential output voltage of the AC bridge. The low-pass filter 20 removes the high-frequency component of the signal generated by the synchronous detector to provide a direct current (DC) output signal that represents the relative displacement between the probe stage 23 and the substrate 24.

To improve position detection sensitivity in the electrostatic capacitance position detection device described above, the area of capacitor electrodes must be increased. Since the capacitor electrodes are disposed perpendicular to the major surfaces of the target stage and the substrate, this would require that relatively large appendages carrying the capacitor electrodes be affixed to the target stage and substrate. As a result, probe devices that use such position detection techniques must be relatively large. As such, they are not useful for such applications as integrated circuits.

What is needed is a position detection device that has a high detection resolution, an output signal that linearly represents position, and that can easily be made as part of an integrated circuit.

SUMMARY OF THE INVENTION

The invention provides a position detection device that can be used to precisely detect the relative position between two substrates. These substrates may be, for example, a probe integrated circuit and a stage integrated circuit. The position detection device may integrated with a probe device without significantly increasing the size of the probe device. For example, the position detection device according to the invention may be fabricated as part of an integrated circuit that forms part of the probe device.

The position detection device according to the invention comprises a first substrate, a second substrate, an alternating current (AC) bridge comprised of four variable capacitors, and a detection circuit. The first and second substrates have a flat first electrode surface and a flat second electrode surface, respectively. The second substrate is mounted opposite the first substrate with the first electrode surface opposite the second electrode surface and separated from the second electrode surface by a minute gap. The second substrate and the first substrate are movable relative to one another in the plane of the electrode surfaces.

Each of the variable capacitors constituting the AC bridge is composed of a first capacitor electrode located on the first electrode surface and a second capacitor electrode located opposite the first capacitor electrode on the second electrode surface. The capacitor electrodes of two of the variable capacitors are long capacitor electrodes, and the capacitor electrodes of the remaining two of the variable capacitors are short capacitor electrodes. The short capacitor electrodes are shorter than the long capacitor electrodes in the detection direction of the position detection device. The long capacitor electrodes located on the first electrode surface are offset in the detection direction relative to the long capacitor electrodes located on the second electrode surface. The detection circuit derives a position-indicating signal from the output voltage generated by the AC bridge. The position-indicating signal represents the relative position of the first substrate and the second substrate in the detection direction.

The area of overlap between the pair of capacitor electrodes constituting each of the variable capacitors depends on the relative position between the first substrate and the second substrate, e.g., between the stage integrated circuit and the probe integrated circuit. Consequently, the capacitances of the four variable capacitors vary linearly depending on the relative position between the stage integrated circuit and the probe integrated circuit. Each variable capacitor constitutes one arm of the AC bridge circuit so the output voltage of the AC bridge changes linearly depending on the relative position between the stage integrated circuit and the probe integrated circuit. This allows the relative position between the stage integrated circuit and the probe integrated circuit to be determined by detecting the bridge output voltage. This is because the bridge output voltage depends on the capacitance resulting from the position-dependent area of overlap between the capacitor electrodes of each variable capacitor.

Since the capacitor electrodes are oriented parallel to the electrode surfaces of the substrates, and since all of the capacitors constituting the AC bridge are variable capacitors, the invention provides a position detection device that has a smaller shape and improved sensitivity compared to conventional electrostatic capacitance position detection devices. Since all the capacitors of the AC bridge are variable capacitors, the position detection device is insensitive to position changes in the two directions orthogonal to the detection direction. Since all the capacitors of the AC bridge are variable capacitors, the position-indicating signal varies linearly with the relative position between the stage integrated circuit and the probe integrated circuit. The position detection device has the further advantage of being easy to manufacture, since the capacitor electrodes can be formed on the surface of an integrated circuit using standard integrated circuit fabrication technology, and position detection circuit can be simultaneously fabricated in the integrated circuit using similar fabrication techniques.

The capacitor electrodes are separated by a dielectric. In one embodiment of the invention, the dielectric is air. However, parasitic capacitance may occur between the capacitor electrodes and the integrated circuit with the interlayer isolator that isolates the capacitor electrodes from the integrated circuit providing the dielectric. Such parasitic capacitance may be larger than the capacitance of the variable capacitors that constitute the AC bridge circuit. Further, such parasitic capacitance is nearly independent of the relative position between the probe integrated circuit and the stage integrated circuit, and is connected in parallel with the variable capacitors constituting the AC bridge. Consequently, the parasitic capacitance reduces the sensitivity of the position detection device.

To provide a high position detection sensitivity notwithstanding the effects of parasitic capacitance, the position detection device according to the invention may include a guard electrode located on the opposite side of the interlayer isolator from each capacitor electrode. A coupling circuit applies the voltage on the capacitor electrode to the underlying guard electrode. This voltage cancels the effect of the parasitic capacitance, and prevents the parasitic capacitance from reducing the sensitivity of the AC bridge.

In a preferred variation, two adjacent ones of the capacitor electrodes located on the one of the electrode surfaces are electrically interconnected to provide an output node of the AC bridge. In this case, the position detection device may additionally comprise a guard electrode, the isolation layer and a coupling circuit. The guard electrode is located on the first electrode surface and underlies the interconnected capacitor electrodes located on this electrode surface. The isolation layer is sandwiched between the guard electrode and the capacitor electrodes. The coupling circuit couples the voltage from the output node to the guard electrode to neutralize the effect of the parasitic capacitance.

The interconnected capacitor electrodes are adjacent one another in a first direction. The detection device may additionally comprise an additional guard electrode and an additional isolation layer. The additional guard electrode is located on the second electrode surface and underlies two non-interconnected ones of the capacitor electrodes located on the second electrode surface. The non-interconnected capacitor electrodes are adjacent one another in the first direction. The additional isolation layer is sandwiched between the non-interconnected capacitor electrodes and the additional guard electrode. The coupling circuit additionally couples the voltage from the output node to the additional guard electrode.

Eliminating the effects of parasitic electrostatic capacitance enables air or another gas to be used as the dielectric of the variable capacitors constituting the AC bridge. Using air enables the capacitor electrodes to move freely relative to each other. In this way, the detection sensitivity provided by the position detection device according to the invention in response to relative position changes of the probe integrated circuit and the stage integrated circuit is significantly increased.

The position detection device according to the invention can be made insensitive to temperature variations. The detection circuit can divide the output voltage of the AC bridge by the amplitude of the drive voltage. This makes the position-indicating signal less dependent on the effects of thermal drift in the amplitude of the AC bridge drive voltage.

Position detection errors resulting from differential thermal expansion caused by differential temperature changes between the probe and stage integrated circuits can also be decreased. These errors can be reduced by decreasing the temperature differential between the probe and stage integrated circuits. The temperature differential can be minimized by narrowing the gap between the electrode surfaces of the stage integrated circuit and the probe integrated circuit to less than about 2 μm.

The temperature differential, and hence position detection errors, may be further reduced by sealing an inert gas, such as nitrogen or helium, in the gap between the probe integrated circuit and the stage integrated circuit. Such gases have a higher heat transfer coefficient than that of air and provide a closer thermal coupling between the two integrated circuits.

DETAILED DESCRIPTION OF THE INVENTION

Figure 1:
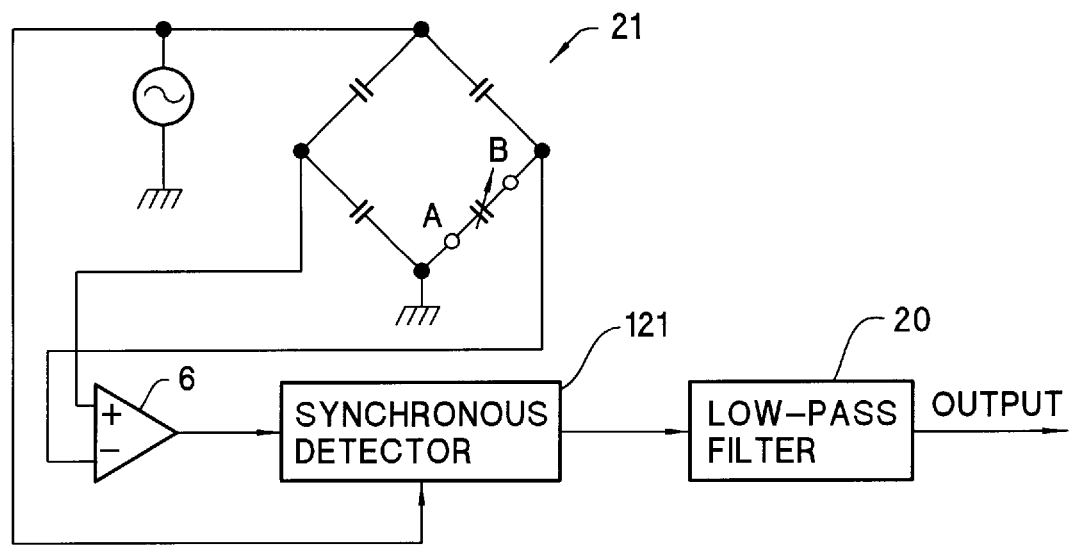
FIG. 1 shows the circuit of a conventional capacitance-type position detection device.
Figure 2:
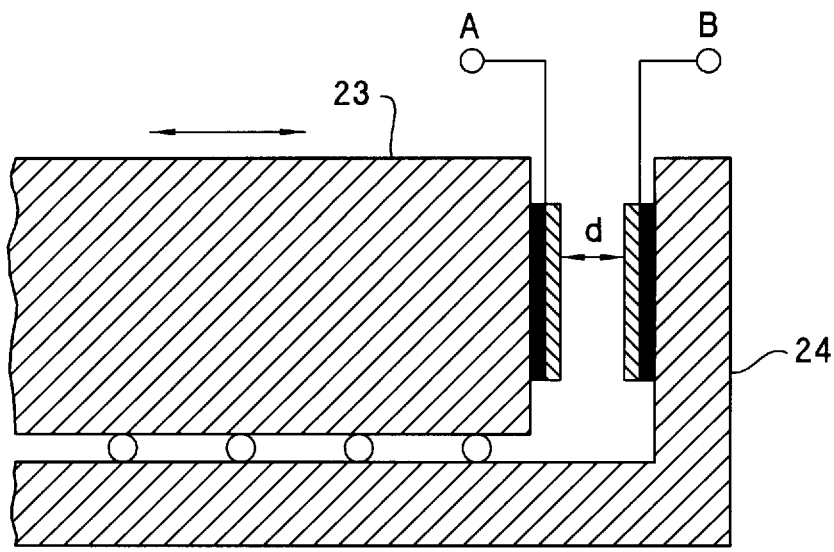
FIG. 2 shows the arrangement of the electrodes in a conventional position detection device.
Figure 3:
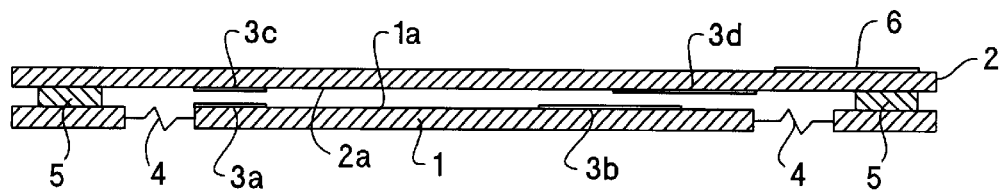
FIG. 3 is a side view of a first embodiment of a capacitance-type position detection device according to the invention.

FIG. 3 shows a side view of the position detection device 0 according to the invention. The position detection device detects the relative position between the stage integrated circuit 1 and the probe integrated circuit 2 in a direction that will be called the detection direction. Additional position detection devices may be provided to detect the relative position between the stage integrated circuit 1 and the probe integrated circuit 2 in additional detection directions. In addition to the stage integrated circuit and the probe integrated circuit, the position detection device also includes the capacitor electrodes 3a–3d and 3e–3h (see FIGS. 4A and 4B), the suspension 4, the spacer 5, and the detection circuit 6.

The stage integrated circuit includes the flat stage electrode surface 1a, and the probe integrated circuit includes the flat probe electrode surface 2a. In an embodiment of the invention incorporated in a moving medium-type memory device, a recording medium is formed on part of the stage electrode surface. Data are read and written on the surface of the recording medium by probes (not shown) formed on or in part of the probe electrode surface.

The stage integrated circuit 1 is supported by the suspension 4 with the stage electrode surface 1a opposite and parallel to the probe electrode surface 2a of the probe integrated circuit 2. The stage integrated circuit is supported so that the stage electrode surface is separated from the probe electrode surface by a minute gap. The width of the gap is preferably less than several microns and may be defined by the thickness of the spacers 5. The suspension maintains the stage integrated circuit in a position in which the stage electrode surface is substantially parallel to the probe electrode surface. The position of the stage integrated circuit in a plane parallel to the probe electrode surface may be changed in at least one direction by a force applied by an actuator (not shown). Several suitable types of actuators are known in the art. The direction in which the actuator moves the stage integrated circuit preferably coincides with the detection direction of the position detection device 0. The detection circuit 6 is shown located on the probe integrated circuit, but may be located on the stage integrated circuit, or may be divided between the two integrated circuits.

FIG. 3 shows the pair of short capacitor electrodes 3a, 3c and the pair of long capacitor electrodes 3b, 3d located on opposed electrode surfaces 1a and 2a of the stage integrated circuit 1 and the probe integrated circuit 2. The capacitor electrodes are "short" or "long" in the detection direction of the position detection device 0. In the example shown in FIG. 3, the detection direction coincides with the x-direction in FIG. 4A.

The pair of short capacitor electrodes 3a, 3c and the pair of long capacitor electrodes 3b, 3d each form a variable capacitor that has air as a dielectric and whose capacitance depends on the position of the stage integrated circuit 1 in the detection direction. An additional pair of short capacitor electrodes and an additional pair of long capacitor electrodes (hidden behind the capacitor electrodes 3a–3d and therefore not shown in FIG. 3) form two more variable capacitors whose capacitance also depends on the position of the stage integrated circuit. As will be described in more detail below, additional capacitor electrodes can be provided to form variable capacitors whose capacitance depends on the position of the stage integrated circuit in an additional detection direction. For example, the additional detection direction may be the y-direction, orthogonal to the x-direction, shown in FIG. 4A.

As noted above, the position detection device 0 according to the invention actually includes four pairs of capacitor electrodes, two pairs of short capacitor electrodes 3a, 3c and 3e, 3h, and two pairs of long capacitor electrodes 3b, 3d, and 3f, 3g. The capacitor electrodes, their relative sizes and the positional relationships between them are shown in detail in the top view of the part of the probe integrated circuit 2 shown in FIG. 4A and in the top view of the stage integrated circuit 1 shown in three positions in FIGS. 4B–4D. The capacitor electrodes 3a, 3b, 3e and 3f are located on the stage electrode surface 1a of the stage integrated circuit and the capacitor electrodes 3c, 3d, 3g and 3h are located on the probe electrode surface 2a of the probe integrated circuit, opposite the stage electrode surface.

Figure 4A:
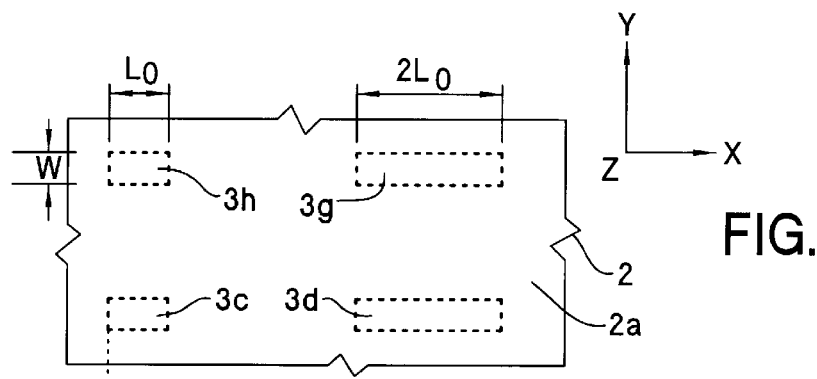
FIGS. 4A–4D are top views showing the relative locations of the capacitor electrodes in various positions of the stage integrated circuit in the position detection device shown in FIG. 3.

FIG. 4A shows the shapes and positions of the capacitor electrodes 3c, 3d, 3g and 3h located on part of the probe electrode surface 2a of the probe integrated circuit 2. The length of the long capacitor electrodes 3d and 3g in the x-direction, i.e., in the detection direction of the position detection device 0, is greater than that of the short capacitor electrodes 3c and 3h. Preferably, the length $2 L_0$ of the long capacitor electrodes 3d and 3g is twice the length $L_0$ of the short capacitor electrodes 3c and 3h. The capacitor electrodes located on the probe integrated circuit 2 are shown in FIGS. 4A–4D as having the same width W as those mounted on the stage integrated circuit 1, but this is not critical. The capacitor electrodes located on the probe integrated circuit can have a different width from those located on the stage integrated circuit. Moreover, to accommodate movement of the stage integrated circuit in the y-direction, the capacitor electrodes may have widths that are greater than their lengths, as will be described below with reference to FIGS. 12A–12C.

The capacitor electrodes 3c, 3d, 3g and 3h are shown in FIG. 4A as having a rectangular arrangement, but the arrangement of the capacitor electrodes is not critical provided that substantial electrostatic interaction between adjacent electrodes is avoided.

Figure 4B:
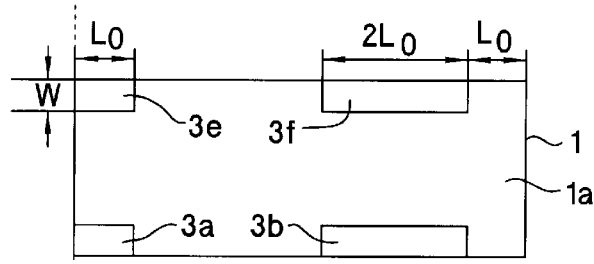

FIG. 4B shows the shapes and positions of the capacitor electrodes 3a, 3b, 3e and 3f located on the stage electrode surface 1a of the stage integrated circuit 1. Each of the capacitor electrodes 3a, 3b, 3e and 3f is located opposite the corresponding one of the capacitor electrodes 3c, 3d, 3h and 3g, respectively, and has a similar length in the x-direction. The length in the x-direction of the long capacitor electrodes 3b, 3f is preferably the same as that of the long capacitor electrodes 3d, 3g, and that of the short capacitor electrodes, 3a, 3e is preferably the same as that of short capacitor electrodes 3c, 3h. The length in the x-direction 2 $L_0$ of the long capacitor electrodes 3b, 3f is preferably twice the length $L_0$ of the short capacitor electrodes 3a, 3e.

The short capacitor electrodes 3a, 3e and 3c, 3h, respectively, are located opposite one another, whereas the long capacitor electrodes 3b, 3f and 3d, 3g, respectively, are offset from one another in the detection direction, i.e., in the x-direction. The amount of the offset in the x-direction is preferably equal to the length of the short capacitor electrodes in the x-direction, and equal to one-half of that of the long electrodes.

FIG. 4B shows the stage integrated circuit 1 in what will be called its home position. In the home position, the short capacitor electrodes 3a, 3e and 3c, 3h, respectively, completely overlap one another in the x-direction. The long capacitor electrodes 3b, 3f and 3d, 3g respectively overlap one another by 50% of their length. This can be seen by comparing FIGS. 4A and 4B.

Figure 4C:
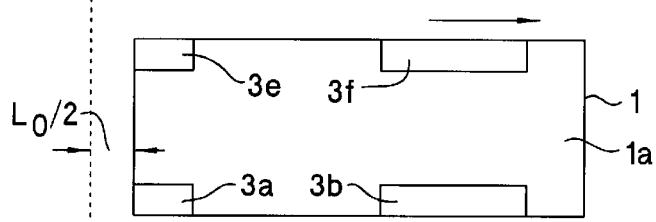
Figure 4D:
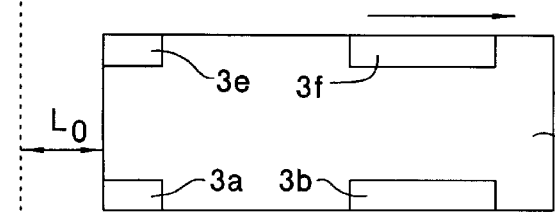

FIG. 4C shows the stage integrated circuit 1 displaced from its home position in the +x-direction by a distance of $L_0/2$, while FIG. 4D shows the stage integrated circuit 1 displaced from its home position in the +x-direction by a distance of $L_0$. The overlap between the capacitor electrodes located on the stage integrated circuit 1 with the corresponding capacitor electrodes located on the probe integrated circuit 2 in these positions can be seen by comparing FIG. 4A with the relevant one of FIGS. 4C and 4D. FIGS. 4C and 4D will be described further below.

Figure 5:
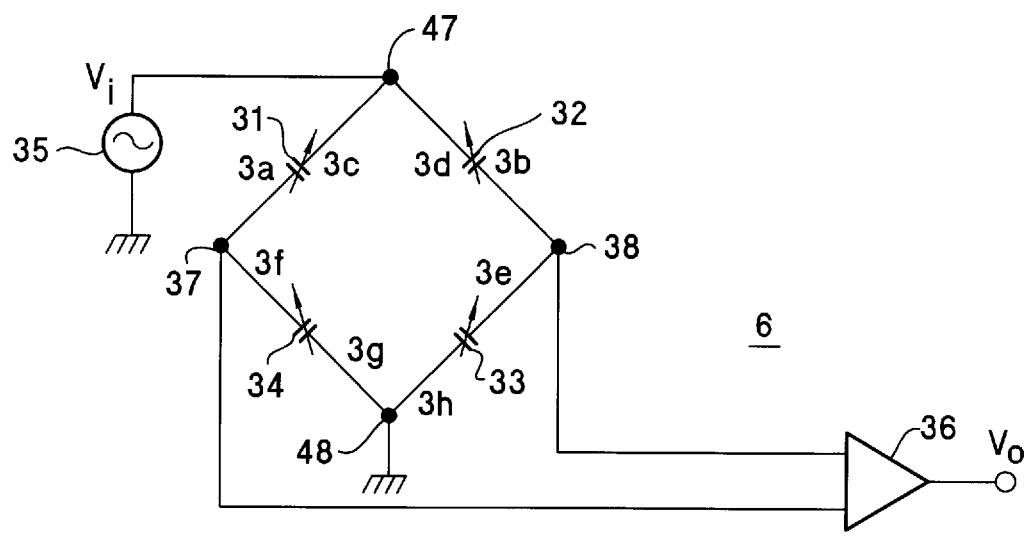
FIG. 5 is circuit diagram of the AC bridge formed by the capacitor electrodes in the position detection device shown in FIGS. 3, 4A and 4B.

When the pairs of capacitor electrodes 3a, 3c; 3b, 3d; 3e, 3h; and 3f, 3g are located relative to one another in any of the positions shown in FIGS. 4A–4D, they form the variable capacitors 31, 32, 33 and 34 shown in FIG. 5. The capacitor electrodes 3a–3h are electrically interconnected as shown in FIG. 5 so that the capacitors 31–34 to form the bridge circuit 30. The capacitor electrodes are interconnected so that the capacitors 31 and 33, respectively composed of the pairs of short capacitor electrodes 3a, 3c and 3e, 3h, constitute one pair of opposite arms of the bridge circuit, and the capacitors 32 and 34, respectively composed of the long capacitor electrode pairs 3b, 3d and 3f, 3g, constitute the other pair of opposite arms of the bridge circuit. The opposed input nodes of the bridge circuit are connected to the oscillator 35 that generates the alternating drive voltage $V_i$, so that the bridge circuit and the oscillator collectively constitute an AC bridge. The opposed output nodes 37 and 38 of the bridge circuit are connected to the differential amplifier 36 which forms part of a detection circuit 6 that will be described in more detail below. The differential amplifier 36 takes the difference between the voltages at the output nodes of the bridge circuit to generate the bridge output voltage $V_o$. In the example shown, the differential gain of the differential amplifier is such that the bridge output voltage $V_o$ is equal to the differential voltage between the output nodes 37 and 38 of the bridge circuit 30.

When the stage integrated circuit 1 is in its home position shown in FIG. 4B, the areas of the overlapping portions four pairs of capacitor electrodes 3a–3h are each $L_0 \times W$, where W is the width of the capacitor electrodes. Consequently, the capacitances of the four variable capacitors 31–34 are equal, and the bridge circuit 30 is balanced. Consequently, the bridge output voltage $V_o$ generated by the differential amplifier 36 is zero.

FIGS. 4A and 4C show the relative positions of the capacitor electrodes 3a–3h when the stage integrated circuit 1 has moved from the home position by a distance of $L_0/2$ in the +x-direction. In this position, the area of the overlapping portions of the short capacitor electrodes 3a and 3e on the stage integrated circuit and the corresponding short capacitor electrodes 3c and 3h on the probe integrated circuit 2 is $L_0/2 \times W$. Moreover, the area of the overlapping portions of the long capacitor electrodes 3b and 3f on the stage integrated circuit and the corresponding long capacitor electrodes 3d and 3g on the probe integrated circuit is $3 L_0/2 \times W$. Thus, when the stage integrated circuit and the probe integrated circuit are positioned relative to each other as shown in FIGS. 4A and 4C, the bridge circuit 30 is partially imbalanced, and the differential amplifier generates a bridge output voltage $V_o$ equal to $V_i/2$, which is half of the amplitude $V_i$ of the drive voltage applied to the bridge circuit 30 by the oscillator 35.

FIGS. 4A and 4D show the relative positions of the capacitor electrodes 3a–3h when the stage integrated circuit 1 has moved from the home position by a distance of $L_0$ in the +x-direction. In this position, there is no overlap between the short capacitor electrodes 3a, 3c on the stage integrated circuit and the corresponding short capacitor electrodes 3c, 3h on the probe integrated circuit 2. On the other hand, the area of the overlapping portions of the long capacitor electrodes 3b, 3f on the stage integrated circuit and the corresponding long capacitor electrodes 3d, 3g on the probe integrated circuit is $2 L_0 \times W$. As a result, the bridge circuit 30 is completely unbalanced, and the differential amplifier 36 generates a bridge output voltage $V_o$ equal to the amplitude $V_i$ of the drive voltage applied to the bridge circuit by the oscillator 35.

The range of position detection of the position detection device 0 is equal to the length $L_0$ of the short capacitor electrodes. To be able to detect position over the complete range of movement of the stage integrated circuit 1, the length of the short capacitor electrodes should be equal to, or slightly greater than, the range of movement of the stage integrated circuit.

Figure 6:
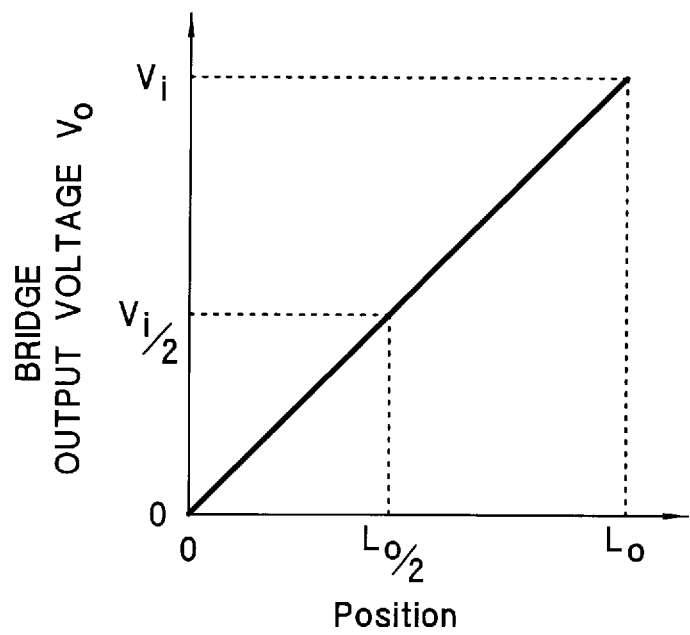
FIG. 6 shows the variation of the bridge output voltage of the AC bridge in the various positions of the stage integrated circuit shown in FIGS. 4A–4D.

FIG. 6 shows that when the stage integrated circuit 1 and the probe integrated circuit 2 are positioned relative to one another as shown in FIGS. 4A–4D, the AC bridge 30, oscillator 35 and differential amplifier 36 shown in FIG. 5, generate a bridge output voltage $V_o$ that is proportional to the position of the stage integrated circuit 1 in the x-direction. Thus, the position of the stage integrated circuit 1 can be determined from the bridge output voltage $V_o$ generated by the differential amplifier 36.

Additional position detection devices, each having a structure similar to that shown in FIGS. 3, 4A and 4B, and 5, can be used in addition to the position detection device 0 just described to determine the position of the stage integrated circuit in additional directions. For example, a further position detection device can be used to determine the position of the stage integrated circuit in the y-direction, in addition to in the x-direction. This can be done by locating an second position detection device (not shown) on the probe integrated circuit 2 and the stage integrated circuit 1 in addition to the position detection device 0 just described. The capacitor electrodes of the second position detection device have their lengths aligned in the y-direction, and the long capacitor electrodes located on the probe integrated circuit and those located on the stage integrated circuit are offset from one another in the y-direction. Each position detection device is insensitive to position changes in directions orthogonal to its detection direction.

The capacitor electrodes and circuits of the position detection device 0 according to the invention can be easily formed on and in an integrated circuit. Thus, the invention is well suited for applications in which size is a critical factor, such as a position detection device for a moving medium-type memory.

Figure 7:
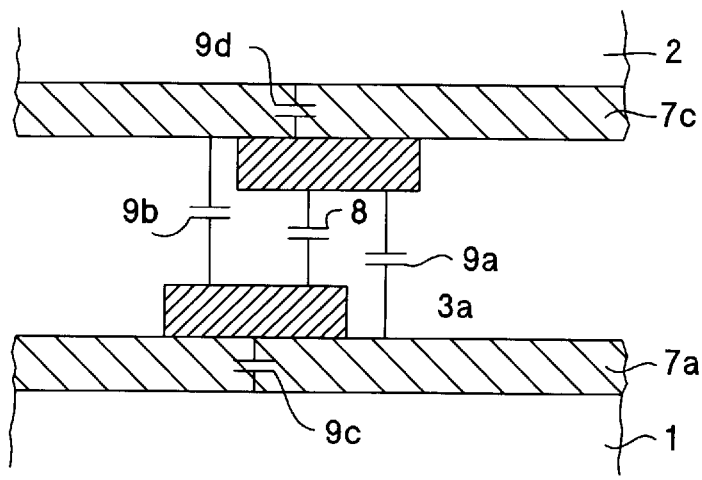
FIG. 7 shows the parasitic capacitances that can occur when the capacitor electrodes are formed on an integrated circuit.

FIG. 7 illustrates a problem that occurs when the capacitor electrodes of the position detection device shown in FIGS. 3, 4A and 4B are located on the surface of an integrated circuit. In FIG. 7, the capacitor electrodes 3a and 3c are one pair of the capacitor electrodes located on the stage electrode surface 1a of the stage integrated circuit 1 and the probe electrode surface 2a of the probe integrated circuit 2, respectively. Each capacitor electrode is isolated from its respective integrated circuit by the interlayer insulators 7a and 7c. The overlapping portion of the capacitor electrodes 3a and 3c creates the inter-electrode capacitance 8 that is used by the position detection device. In addition, in an actual integrated circuit, the parasitic capacitances 9a–9d exist between the capacitor electrodes 3a and 3c and the integrated circuits 1 and 2.

Figure 8:
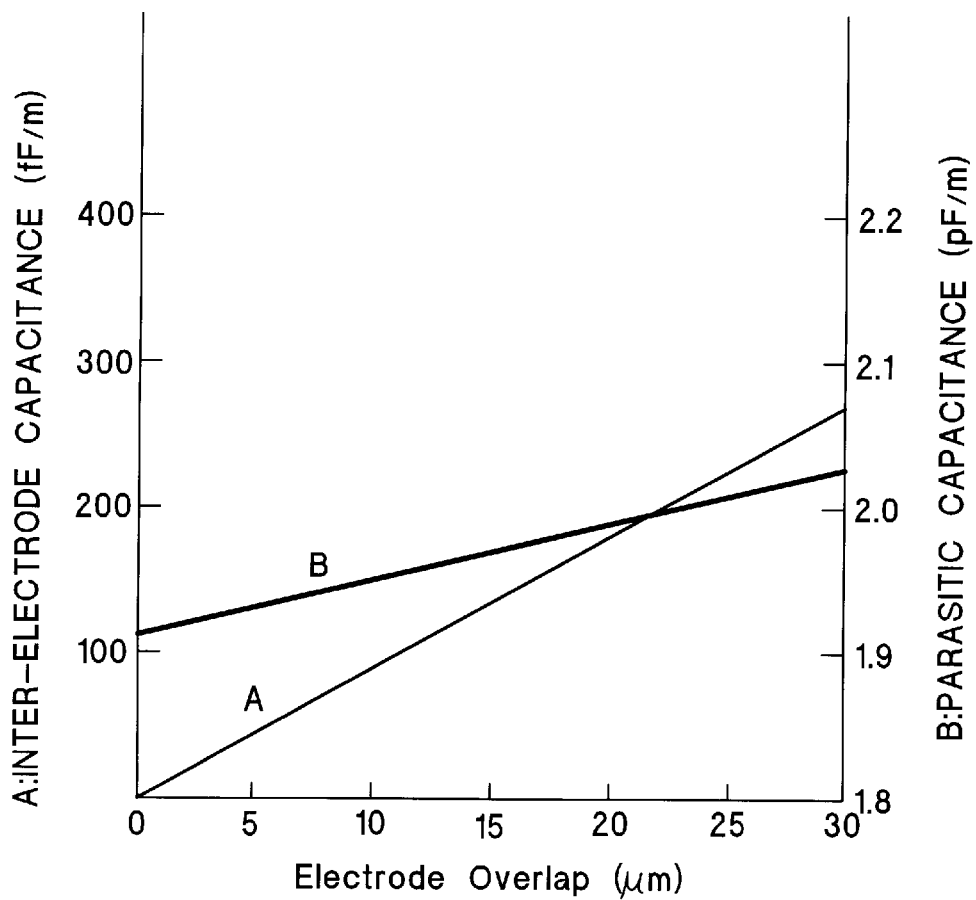
FIG. 8 is a graph showing the capacitance between the capacitor electrodes and the parasitic capacitance in an actual integrated circuit.

FIG. 8 shows one calculated example of the relationship between the inter-electrode capacitance 8 and parasitic capacitances 9a–9d shown in FIG. 7. In this example, the thickness of capacitor electrodes 3a and 3c is 0.6 $\mu$m; the thickness of the interlayer insulators 7a and 7c is 0.6 $\mu$m; the air gap between the capacitor electrodes is 1.0 $\mu$m; and the length of the overlapping portion of the capacitor electrodes is 30 $\mu$m. As is shown in FIG. 8, the inter-electrode capacitance 8 between the capacitor electrodes changes in proportion to the area of overlap between the capacitor electrodes and has a maximum of about 230 fF/m, as indicated by curve A (left-hand scale). The parasitic capacitance is about ten times greater than this, and has a maximum of about 2 fF/m, as indicated by curve B (right-hand scale).

Figure 9:
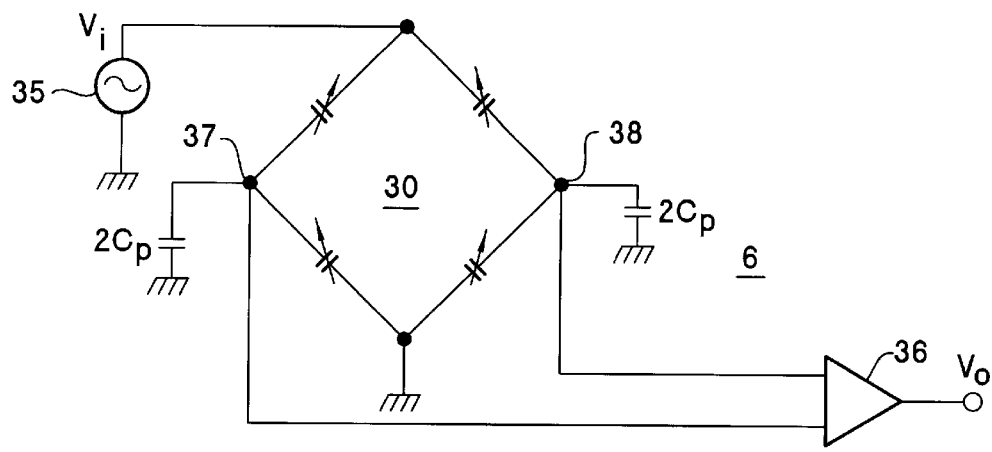
FIG. 9 is an equivalent circuit showing parasitic capacitances added to the AC bridge circuit shown in FIG. 5.
Figure 10:
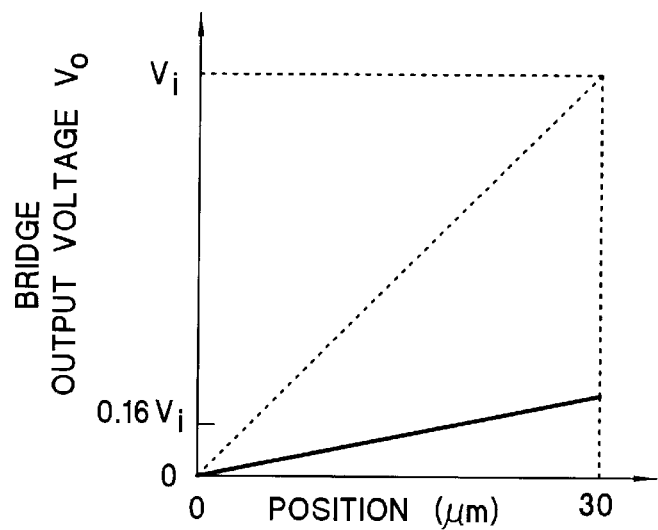
FIG. 10 shows the effect of parasitic capacitance on the variation of the bridge output voltage of the AC bridge in the various positions of the stage integrated circuit shown in FIGS. 4A–4D.

If the value of the parasitic capacitance is defined as Cp, it can be represented by a parasitic capacitance of 2 Cp between each output node 37, 38 of the bridge circuit 30 and ground, as shown in FIG. 9. Because of the parasitic capacitance, percentage change in capacitance resulting from the stage integrated circuit moving in the x-direction is reduced. As a result, the change in the bridge output voltage $V_o$ resulting from movement of the stage integrated circuit in the x-direction is substantially reduced. In a practical example, the parasitic capacitance decreases the maximum bridge output voltage $V_o$ from $V_i$ to about 0.16 $V_i$, as shown in FIG. 10.

Figure 11:
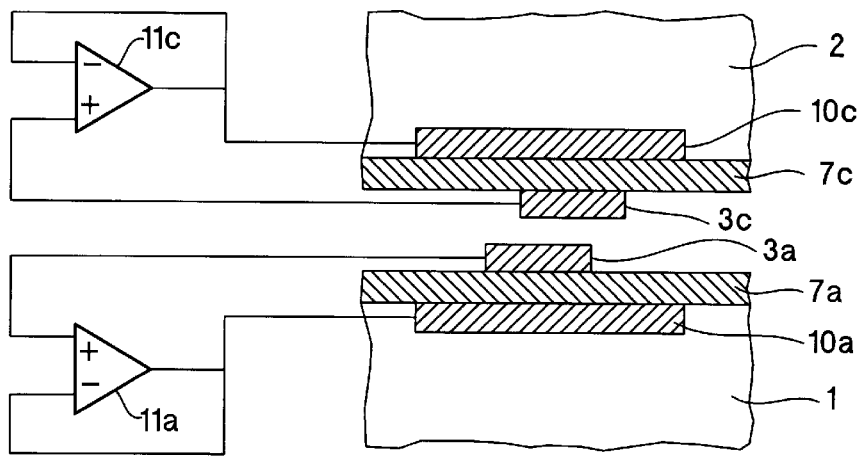
FIG. 11 illustrates a schematic arrangement of guard electrodes provided for removing the effect of parasitic capacitance.

FIG. 11 shows an electrode structure according to the invention that can prevent the decrease in the sensitivity of the bridge circuit 30 caused by parasitic capacitance. In this, the guard electrodes 10a, 10c are respectively interposed between the interlayer insulators 7a, 7c and the surfaces of the stage integrated circuit 1 and the probe integrated circuit 2. The guard electrodes 10a, 10c are respectively connected to the outputs of the buffer amplifiers 11a, 11c. Parasitic capacitances similar to the parasitic capacitances 9c, 9d shown in FIG. 7 respectively exist between the electrode 3a and the guard electrode 10a, and between the electrode 3c and the guard electrode 10c, with the interlayer insulators 7a 7c, respectively, as dielectrics. The unity-gain buffer amplifiers 11a, 11c respectively apply the voltage at each electrode 3a, 3c to the guard electrode 10a, 10c respectively underlying the electrode. This voltage neutralizes the parasitic capacitance between the electrode and its respective guard electrode because the voltage difference between each electrode and its respective guard electrode, i.e., the voltage across the interlayer insulator, is always zero. Consequently, the bridge output voltage $V_o$ generated by the bridge circuit is unaffected by parasitic capacitance. The bridge output voltage depends only on the changes in the inter-electrode capacitance across the gap between the capacitor electrodes 3a, 3c, and not on the parasitic capacitance across the interlayer insulators 7a, 7c.

Figure 12A:
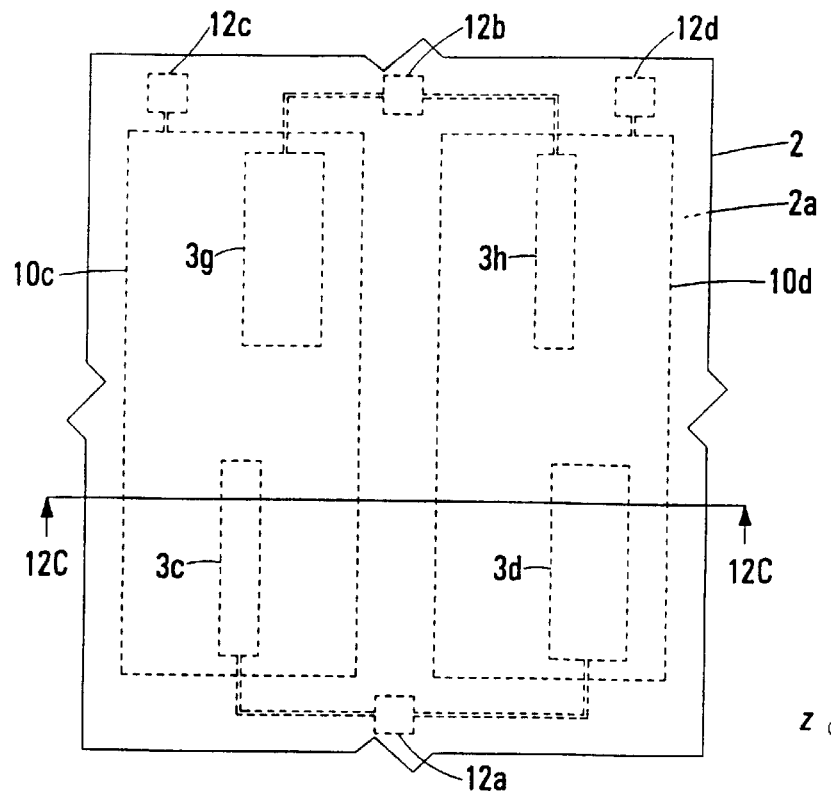
FIGS. 12A–12C show top views and a cross-sectional view of a second embodiment of the position detection device according to the invention in which each guard electrode underlies two adjacent capacitor electrodes.
Figure 12B:
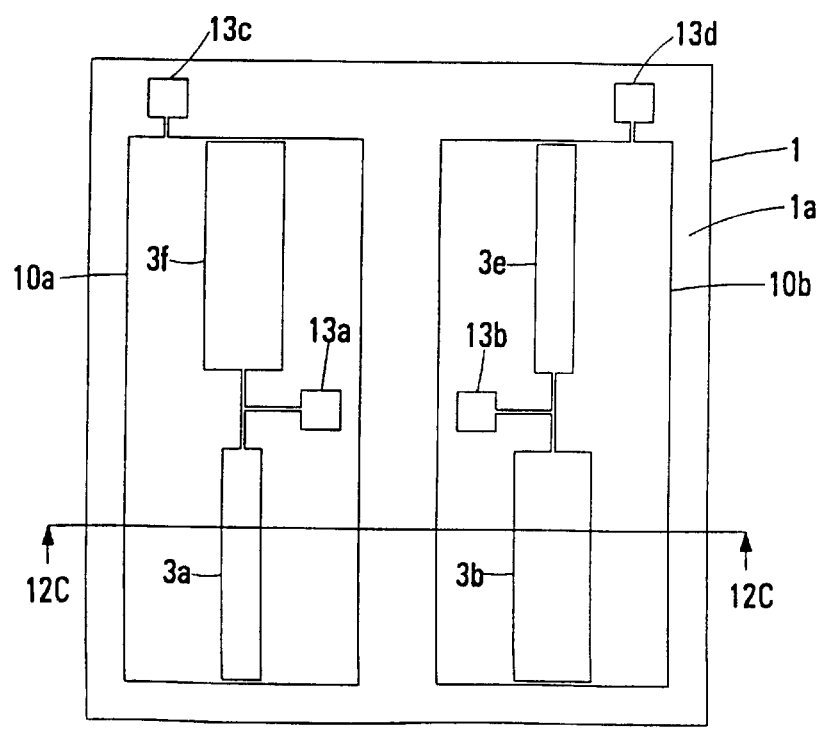
Figure 12C:
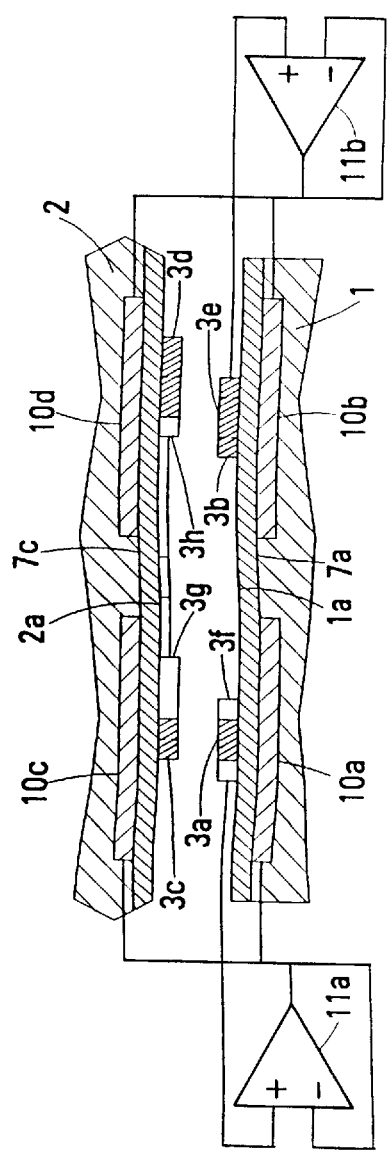

FIGS. 12A–12C show an example of the shape and placement of the capacitor electrodes 3a–3h in a practical example of a position detection device equipped with guard electrodes. The position detection device is shown with the stage integrated circuit 1 in its home position. In this position, the bridge output voltage generated by the differential amplifier 36 in response to the voltage between the output nodes 37 and 38 of the bridge circuit 30 shown in FIG. 5 is zero. The capacitor electrodes 3a–3h are arranged differently in the embodiment shown in FIGS. 12A and 12B from that shown in FIGS. 4A–4D. The long capacitor electrodes 3f, 3g are interchanged with the short capacitor electrodes 3e, 3h to eliminate a cross-over in the interconnections that form the bridge circuit from the capacitor electrodes. Unlike the capacitor electrodes shown in FIGS. 4A–4D, the capacitor electrodes are shown in FIGS. 12A and 12B as being elongate in the y-direction, i.e., in the direction perpendicular to the detection direction. In other words, the width of the electrodes shown in FIGS. 12A and 12B is substantially greater than the length. This electrode shape ensures an adequate area of overlap between the capacitor electrodes of each variable capacitor when the stage integrated circuit moves to the extreme of its travel in the y-direction.

As discussed above in connection with FIG. 4A, the length of the short capacitor electrodes 3a, 3c, 3e and 3h in the x-direction, i.e., in the detection direction, is $L_0$, and the length of the long capacitor electrodes 3b, 3d, 3f and 3g in the x-direction is 2 $L_0$. When the stage integrated circuit moves a distance of $L_0$ from the home position, the AC bridge 30 is completely unbalanced.

In the probe integrated circuit 2 shown in FIG. 12A, the pad 12a is electrically connected via tracks to the capacitor electrodes 3c and 3d. The pad 12a provides the input node 47 of the bridge circuit 30 to which the alternating drive voltage Vi from the oscillator 35 is connected, as shown in FIG. 5. The pad 12b is electrically connected via tracks to the capacitor electrodes 3g and 3h. The pad 12b provides the input node 48 of the bridge circuit 30 and is electrically connected to signal ground.

In the stage integrated circuit 1 shown in FIG. 12B, the pad 13a is electrically connected via a track to the capacitor electrodes 3a and 3f. The pad 13a provides the output node 37 of the bridge circuit 30 shown in FIG. 5. The pad 13b is electrically connected via a track to the capacitor electrodes 3b and 3e. The pad 13b provides the output node 38 of the bridge circuit 30.

In the embodiment shown in FIGS. 12A–12C, twos of adjacent capacitor electrodes share a common guard electrode. FIG. 12A shows the capacitor electrodes 3c, 3d, 3g, 3h located on the probe electrode surface 2a of the probe integrated circuit 2. The guard electrode 10c underlies the adjacent capacitor electrodes 3c and 3g and the guard electrode 10d underlies the adjacent capacitor electrodes 3d and 3h. In the probe integrated circuit, the adjacent capacitor electrodes that share a common guard electrode are not electrically connected to one another. Electrical connections are made to the guard electrodes 10c and 10d via the pads 12c and 12d, respectively.

FIG. 12B shows the capacitor electrodes 3a, 3b, 3e, and 3f located on the stage electrode surface 1a of the stage integrated circuit 1. The guard electrode 10a underlies the adjacent capacitor electrodes 3a and 3f and the guard electrode 10b underlies the adjacent capacitor electrodes 3b and 3e. In the stage integrated circuit, the adjacent capacitor electrodes that share a common guard electrode are electrically connected to one another by the tracks connected to the pads 13a and 13b. Electrical connections are made to the guard electrodes 10a and 10b via the pads 13c and 13d, respectively.

In both the stage integrated circuit 1 and the probe integrated circuit 2, the capacitor electrodes that share a common guard electrode are adjacent one another in the same direction. In the example shown, the capacitor electrodes that share a common guard electrode are adjacent one another in the y-direction, orthogonal to the detection direction. The guard electrodes 10a–10d are dimensioned so that, in the plane of the electrode surfaces 1a and 2a, they extend beyond the capacitor electrodes 3a–3h.

FIG. 12C is a cross sectional view of the stage integrated circuit 1 and part of the probe integrated circuit 2 showing the arrangement of the capacitor electrodes 3a–3h, the interlayer insulators 7a, 7c, and the guard electrodes 10a–10d. The capacitor electrodes 3a–3h and the guard electrodes 10a–10d are located on opposite sides of the interlayer insulators 7a, 7c.

FIG. 12C also schematically shows the interconnections between the capacitor electrodes, the buffer amplifiers 11a, 11b and the capacitor electrodes. The pads 12a–12d and 13a–13d have been omitted from the drawing to simplify it. The input of the unity-gain buffer amplifier 11a is connected to the electrical connection between the capacitor electrodes 3a, 3f that provides the output node 37 of the bridge circuit 30. The output of the unity-gain buffer amplifier 11a is connected to the guard electrodes 10a and 10c that underlie the capacitor electrodes 3a, 3f and 3c, 3g. The input of the unity-gain buffer amplifier 11b is connected to the electrical connection between the capacitor electrodes 3b, 3e that provides the output node 38 of the bridge circuit. The output of the unity-gain buffer amplifier 11b is connected to the guard electrodes 10b and 10d that respectively underlie the capacitor electrodes 3b, 3e and 3d, 3h.

Figure 13:
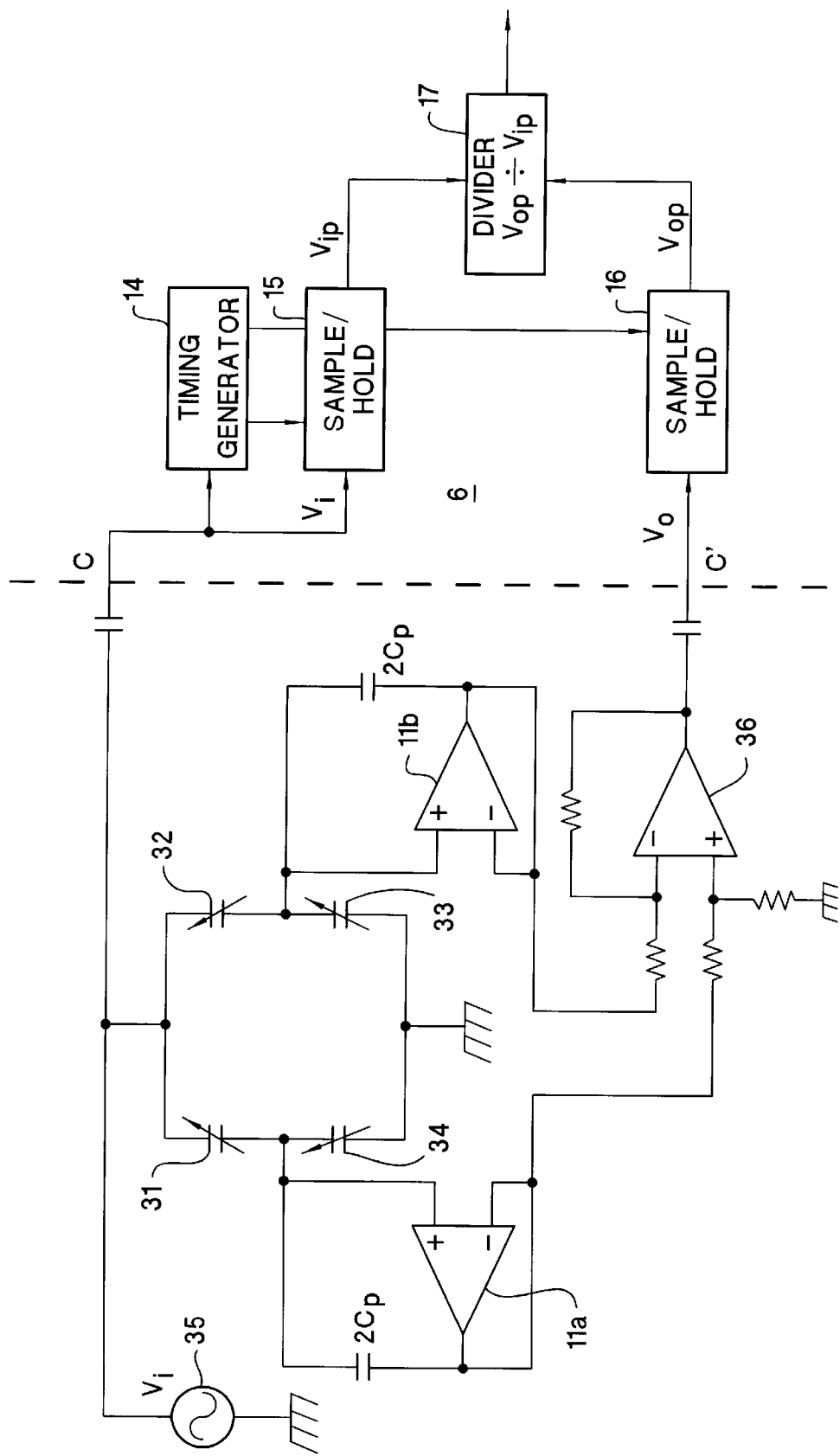
FIG. 13 is a circuit diagram of a detection circuit that includes a divider circuit to improve the stability of the device with respect to the temperature.

Adjacent capacitor electrodes sharing a common guard electrode allows the opposed guard electrodes 10a, 10c to be driven by the unity gain buffer amplifier 11a and allows the opposed guard electrodes 10b, 10d to be driven by the unity-gain buffer amplifier 11b, as shown in FIG. 12C. The opposed guard electrodes are respectively driven by the signals at the output nodes 37, 38 of the bridge circuit 30. Since the differential voltage between the outputs of the unity-gain buffer amplifiers 11a, 11b is equal to the differential voltage between the output nodes of the bridge circuit 30, the input of the differential amplifier 36 is connected to the outputs of the buffer amplifiers, as shown in FIG. 13. FIG. 13 will be described below. The unity-gain buffer amplifiers isolate the output nodes of the bridge circuit from the input impedance of the differential amplifier 36.

The embodiment just described is preferably fabricated on the surface of an integrated circuit. However, the position detection device may alternatively be fabricated on, for example, a surface of a printed circuit board in which multiple wiring layers are used to interconnect electronic devices mounted on a glass epoxy, polyimide, or PTFE-glass substrate.

FIG. 13 shows an example of a complete detection circuit 6 that derives a DC position-indicating signal from the differential output voltage between the output nodes 37 and 38 of the bridge circuit 30 in a position detection device according to the invention. In addition to the differential amplifier 36, the detection circuit includes the timing generator 14, the sample and hold circuits 15, 16 and the divider 17. As noted above with reference to FIG. 5, the four variable capacitors 31, 32, 33, 34 formed by the electrodes 3a–3h shown in FIGS. 4A and 4B or 12A and 12B are interconnected to form the bridge circuit 30. Guard electrodes are located under the capacitor electrodes as described above with reference to FIG. 11.

FIG. 13 also schematically shows the parasitic capacitance 2 Cp formed by the guard electrodes 10a–10d (FIGS. 12A–12C), the electrodes 3a–3h and the interlayer insulators 7a,7c as dielectric, as described above. The bridge circuit 30 is driven by the drive signal $V_i$ generated by the oscillator 35. The AC signals at the output nodes 37 and 38 of the bridge circuit are respectively fed to the guard electrodes 10a, 10c and 10b, 10d by the unity-gain buffer amplifiers 11a and 11b to cancel the effects of the parasitic capacitances 2 Cp. The buffer amplifiers 11a, 11b should have a high input impedance to prevent the amplifier input impedance from attenuating the voltages at the output nodes of the bridge circuit. Also as noted above, the outputs of the buffer amplifiers 11a, 11b provide the outputs of the bridge circuit 30 in addition to driving the guard electrodes.

The outputs of the buffer amplifiers 11a, 11b are connected to the inputs of the differential amplifier 36. The differential amplifier 36 should have a high common mode rejection ratio at the frequency of the drive signal $V_i$. The output signal $V_o$ of the differential amplifier has an amplitude that is proportional to the position of the stage integrated circuit in the detection direction.

FIGS. 14A–14F show the waveforms at various points in the signal processing circuit shown in FIG. 13.

Figure 14:
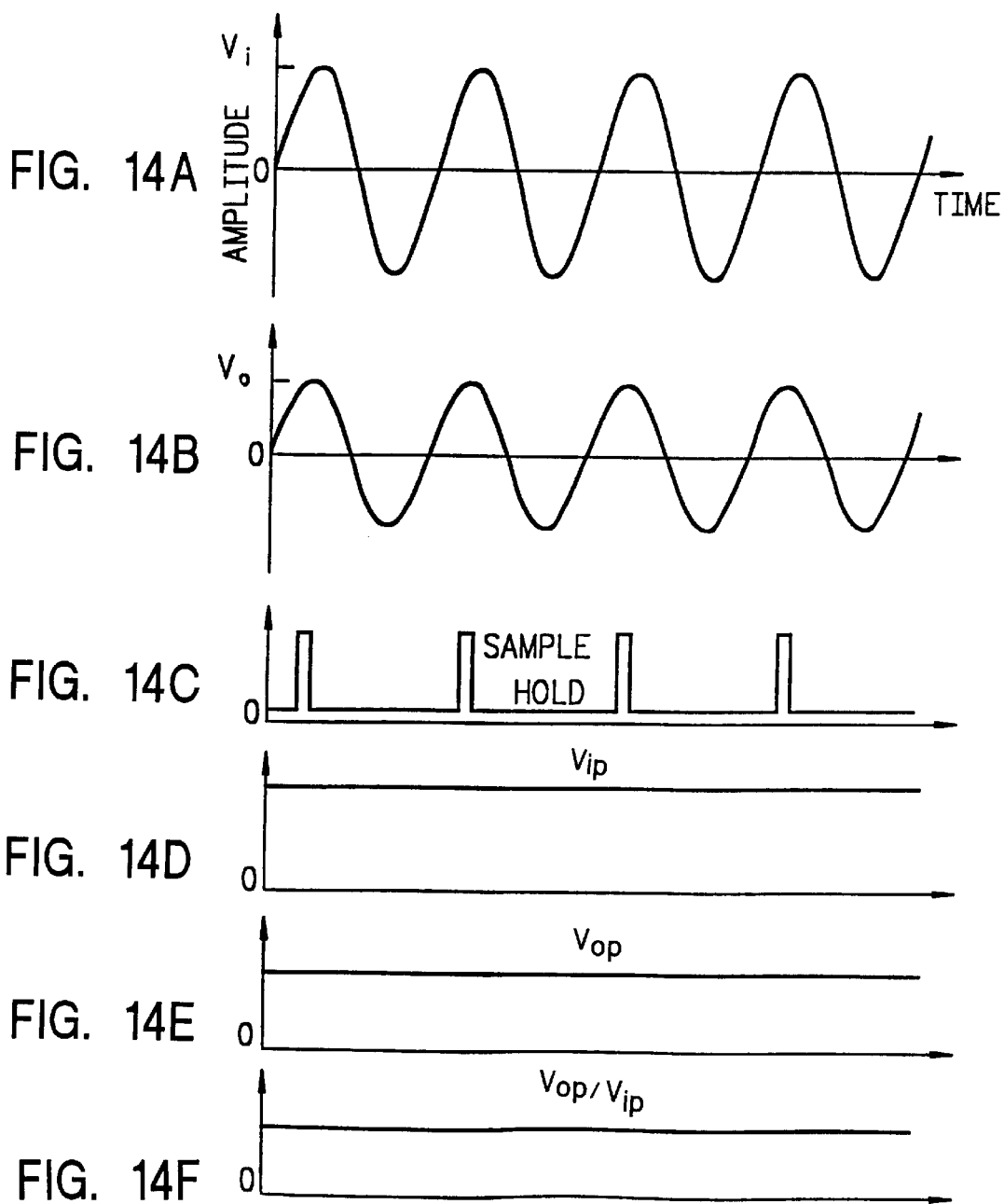
FIGS. 14A–14F show the operating waveforms at various points in the detection circuit shown in FIG. 13.

FIG. 14A shows the waveform of the drive signal $V_i$ from the oscillator 35 that drives the bridge circuit 30. The peak value of the drive signal $V_i$ is $V_{ip}$.

FIG. 14B shows the bridge output signal $V_o$ generated by the differential amplifier 36 in response to the difference between voltages on the output nodes 37 and 38 of the bridge circuit 30. The peak voltage $V_{op}$ of the bridge output signal is proportional to distance of the stage integrated circuit 1 from its home position.

The peak values of the drive signal and the bridge output signal output by the differential amplifier 36 are sampled by the sample and hold circuits 15 and 16. The timing generator 14 generates a sampling pulse synchronously with each positive peak of the drive signal and feeds the sampling pulses to the sample and hold circuits 15 and 16. FIG. 14C shows the waveform of the sampling pulses generated by the timing generator 14.

FIGS. 14D and 14E show the output waveforms generated by the sample and hold circuits 15 and 16 in response to the sampling pulses. Both waveforms are DC voltages that correspond to the peak values $V_{ip}$ and $V_{op}$ of the drive signal and the bridge output signal, respectively. The oscillator 35 that generates the drive signal $V_i$ preferably includes an automatic gain control to ensure that the amplitude of the drive signal remains constant.

When the circuits shown in FIG. 13 are fabricated on an integrated circuit along with the capacitor electrodes 3a–3h, the amplitude of the drive signal may drift due to temperature changes resulting from heat generated by the integrated circuit. Consequently, the bridge output signal $V_o$ generated at a given position of the stage integrated circuit may vary depending on the temperature of the integrated circuit. Thus, the signal processing circuit shown in FIG. 13 includes the divider 17 that substantially eliminates the effect of thermal drift on the amplitude of the drive signal, and hence on the bridge output signal. The DC output level generated by the sample and hold circuit 15 corresponds to the peak value $V_{op}$ of the bridge output signal and input to the divider 17. The DC level generated by the sample and hold circuit 15 corresponds to the peak value $V_{ip}$ of the drive signal and is also input into the divider. The DC level corresponding to $V_{op}$ is the numerator and the DC level corresponding to $V_{ip}$ is the denominator in the division operation performed by the divider. The result of the division operation performed by the divider is a DC signal that corresponds to the position of the stage.

In the divider 17, the DC level corresponding to the peak value $V_{ip}$ of the drive signal is typically a constant value. However, if the DC level corresponding to $V_{ip}$ changes, the ratio of the amplitudes $V_{ip}$ and $V_{op}$ depends only on the relative positions of the capacitor electrodes. Consequently, the output of the divider 17 is independent of the amplitude of the drive signal, and stable operation of the position detection device is assured.

By using the detection circuit 6 shown in FIG. 13, the position detection device may be produced so that it is resistant to temperature changes. Further, by making the output of the detection circuit independent of the drive amplitude using the divider 17, and by using a conventional automatic gain control to stabilize the drive amplitude, the position detection can be made with greater precision. Accordingly, this embodiment of the invention is well suited for use as a position detection device in a moving medium-type memory device, where precise and stable position detection over a long time period and under varying environmental conditions is required.

Figure 15:
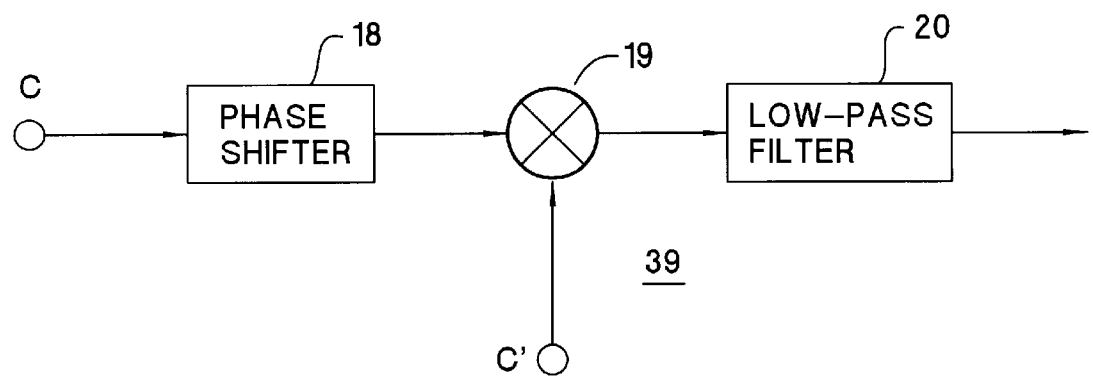
FIG. 15 shows an alternative detection circuit that uses a multiplier circuit.

The detection circuit 6 described above is suited to high-precision position detection, but if this level of precision is not required, a simpler detection circuit such as the detection circuit 39 shown in FIG. 15 can be used instead. The detection circuit 39 shown in FIG. 15 is composed of a serial arrangement of the phase shifter 18, the multiplier 19, and the low-pass filter 20. The inputs to the phase shifter 18 and the multiplier 19 are respectively connected to the points C and C' in the circuit shown in FIG. 13. The phase shifter 18 sets the phase of the bridge output signal generated by the differential amplifier 36 to one at which the output of the low-pass filter 20 is a maximum to provide the highest possible detection sensitivity.

Ways of reducing the temperature dependence of the position detected by the position detection device according to the invention will also now be described. Generally, when position is measured to an accuracy of the order of nanometers, temperature variations in the measurement environment must be minimized. This is because thermal expansion of the structural elements of the position measurement device, such as the stage integrated circuit and the probe integrated circuit, is sufficiently large as to become a factor in position detection accuracy. In a moving medium-type memory device that comprises a stage integrated circuit and a probe integrated circuit, differential thermal expansion between the stage integrated circuit and the probe integrated circuit can impair the position detection accuracy. This is true even if the temperature of the surrounding environment is stable because temperature changes in the order of several tens of degrees C are produced by the integrated circuits themselves as they are powered up and powered down.

For example, the thermal expansion coefficient of silicon is 2.6 ppm/°C. A temperature increase of about 40° C. will cause a stage integrated circuit made of a 1 cm-square silicon chip to expand by about 1 $\mu$m. This amount of thermal expansion would make it impossible to position a probe with the accuracy required to read or write data in a moving medium-type memory device in which the size of one bit is of the order of several tens of nanometers unless compensation for thermal expansion were provided.

This problem is solved in one preferred embodiment of the invention by maintaining an extremely narrow gap of less than about 2 $\mu$m between the electrode surfaces 1a and 2a of the stage integrated circuit 1 and the probe integrated circuit 2. Thermal expansion can be further reduced by sealing the gap using known techniques and by placing an inert gas having a high heat transfer coefficient in the gap. Even when only air is sealed the gap, maintaining a gap of less than about 2 $\mu$m will reduce the temperature difference between the electrode surfaces of the integrated circuits to less than 1° C. Maintaining such a small gap is also desirable because it increases the capacitance between the capacitor electrodes 3a–3h. This helps to make the output impedance of the bridge circuit 30 at the drive frequency significantly less than the input impedance of the buffer amplifiers 11a and 11b, and thus helps to prevent the input impedance of the buffer amplifiers from reducing the sensitivity of the bridge circuit.

It is desirable for the gas sealed in the gap have a high heat transfer coefficient. This corresponds to a small accommodation coefficient. The accommodation coefficient measures the amount of energy that is retained by the gas when the molecules of the gas collide with the surfaces of the probe and stage integrated circuits. The accommodation coefficient of air is about 0.9. In contrast, the accommodation ratio of nitrogen is 0.35, and that of helium is 0.04. By sealing one of these gases in the gap instead of air, the temperature difference between the electrode surfaces of the integrated circuits can be further reduced. For example, using a gas other than air can decrease the temperature difference between the electrode surfaces to less than 0.1° C. This temperature difference corresponds to positioning error of about 2.6 nm in a 1 cm-square silicon integrated circuit.

Figure 16:
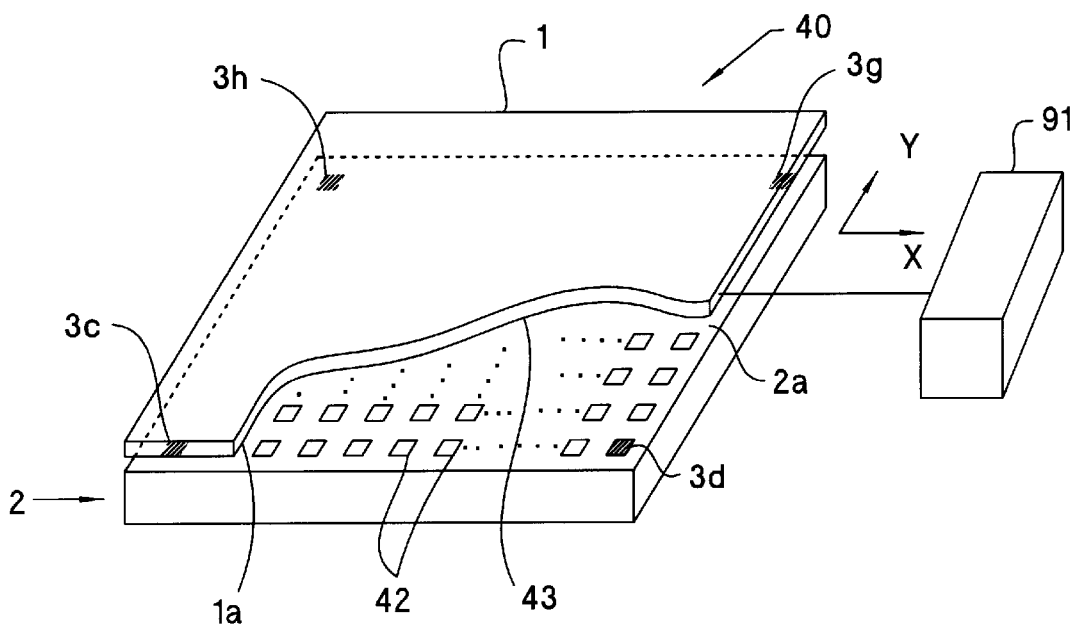
FIG. 16 shows an embodiment of the position detection device according to the invention incorporated in a moving medium-type memory.

FIG. 16 shows a moving medium-type memory device incorporating an embodiment the position detection device according to the invention. The moving medium-type memory device 40 includes the stage integrated circuit 1 and the probe integrated circuit 2. The probe 42 is an exemplary one of multiple probes formed in an array in or on the probe electrode surface 2a of the probe integrated circuit. The memory medium 43 is located on the stage electrode surface 1a of the stage integrated circuit. The stage integrated circuit is supported opposite the probe integrated circuit by suitable supports (not shown) so that the probe electrode surface 2a of the probe integrated circuit is disposed parallel to the stage electrode surface 1a of the stage integrated circuit, and is separated therefrom by a small gap. The actuator 91 provides relative movement between the stage integrated circuit and the probe integrated circuit in the x- and y-directions in response to position information from the position detection device.

In the moving medium-type memory device 40, reading and writing are performed between the probe 42 and the memory medium 43. Capacitor electrodes 3c, 3d, 3g, 3h are located on the probe electrode surface 2a of the probe integrated circuit 2, and corresponding capacitor electrodes (not shown) similar to capacitor electrodes 3a, 3b, 3e and 3f shown in FIGS. 12A and 12B, are located on the stage electrode surface 1a of the stage integrated circuit 1, in an arrangement similar to that shown in FIGS. 12A–12C. Opposed pairs of the capacitor electrodes form capacitors having a dielectric of air or another gas that fills the gap between the opposed electrode surfaces 1a and 2a. The capacitor electrodes shown are the capacitor electrodes of one of two orthogonal position detection devices located on the electrode surfaces of the probe integrated circuit and the stage integrated circuit to provide position detection in both the x- and y-directions. The positions detected by the position detection devices are fed back to the actuator 91 to form a closed loop.

Figure 17:
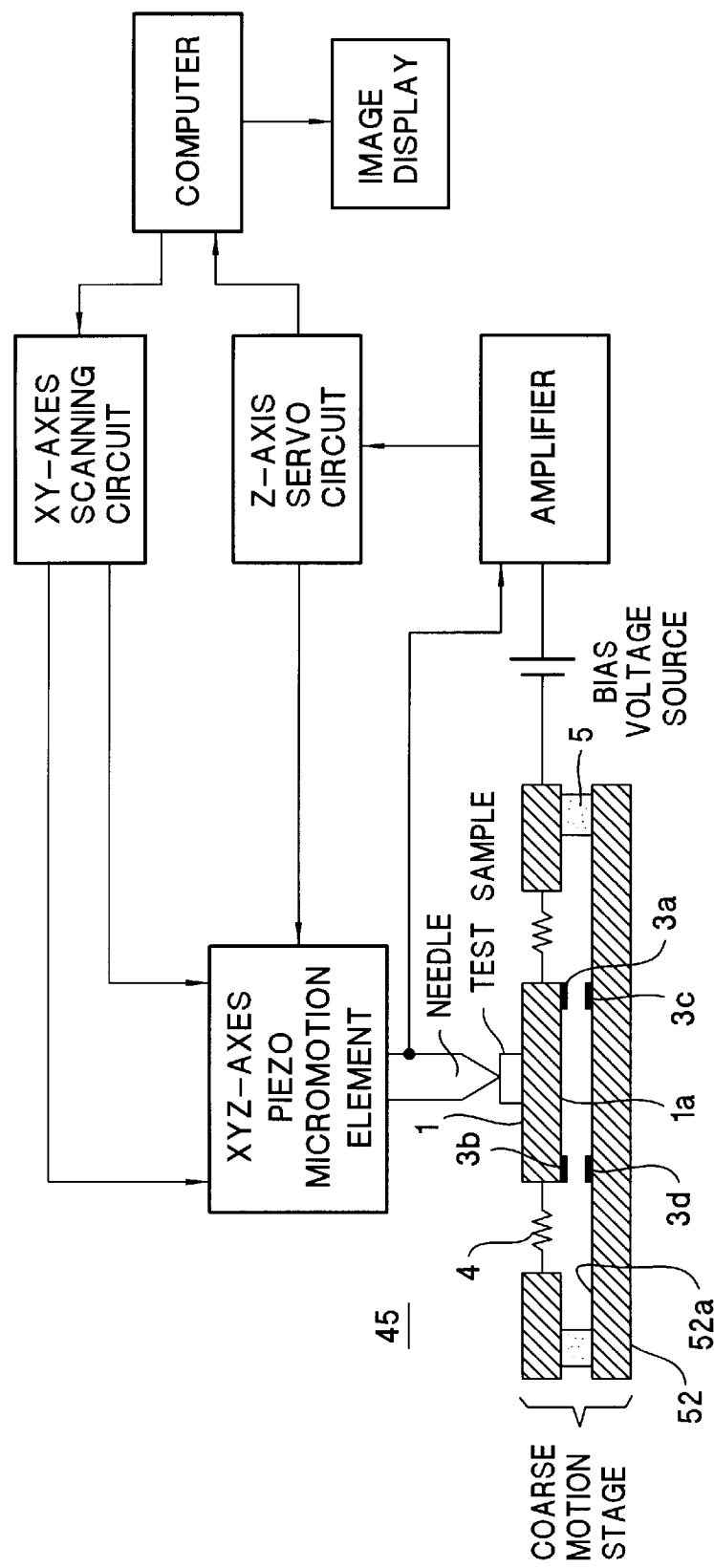
FIG. 17 shows an embodiment of the invention the position detection device according to the invention incorporated in a scanning tunnel microscope.

FIG. 17 shows the coarse motion stage 45 of a scanning tunnelling microscope that incorporates an embodiment of the position detection device according to the invention. The coarse motion stage includes the stage integrated circuit 1, the substrate integrated circuit 52, the capacitor electrodes 3a–3d and four additional capacitor electrodes (not shown) located on the electrode surfaces 1a and 52a of the probe integrated circuit and the stage integrated circuit, respectively, the suspension 4, and the spacers 5 in a similar arrangement to that described above with reference to FIGS. 3, 4A and 4B. The measurement sample is placed on the surface of the stage integrated circuit 1 opposite the stage electrode surface 1a. The suspension 4 locates the stage integrated circuit relative to the substrate integrated circuit so that the stage electrode surface is substantially parallel to the substrate electrode surface and is separated from the substrate electrode surface by a minute gap of less than several microns. The suspension also allows the stage integrated circuit to move freely substantially parallel to the substrate integrated circuit.

The capacitor electrodes 3a–3d and four more capacitor electrodes (not shown, but similar to the capacitor electrodes 3e–3h shown in FIGS. 4A and 4B) are located on the electrode surfaces 1a and 52a of the stage integrated circuit 1 and the substrate integrated circuit 52. In the example shown in FIG. 17, the electrodes 3a and 3c and the electrodes 3b and 3d form capacitors having an air dielectric. Similar to the moving medium-type memory device described above, two orthogonally-disposed position detection devices are provided to detect the position of the stage integrated circuit in both the x- and y-directions.

Although the invention is described herein with reference to the preferred embodiment, one skilled in the art will readily appreciate that other applications may be substituted for those set forth herein without departing from the scope of the invention. Accordingly, the invention should only be limited by the claims set forth below.

We claim:

1. A position detection device for detecting position in a detection direction, the position detection device comprising:

a first substrate including a flat first electrode surface;

a second substrate including a flat second electrode surface, the second substrate being mounted opposite the first substrate with the first electrode surface opposite the second electrode surface and separated from the second electrode surface by a minute gap, the second substrate and the first substrate being movable relative to one another;

an alternating current (AC) bridge comprised of four variable capacitors, each of the variable capacitors including an electrode pair composed of a first capacitor electrode located on the first electrode surface and a second capacitor electrode located opposite the first capacitor electrode on the second electrode surface, the capacitor electrodes of two of the variable capacitors being long capacitor electrodes, the capacitor electrodes of a remaining two of the variable capacitors being short capacitor electrodes, the short capacitor electrodes being shorter than the long capacitor electrodes in the detection direction, the long capacitor electrodes located on the first electrode surface being offset in the detection direction relative to the long capacitor electrodes located on the second electrode surface; and detection circuit means for deriving from an output voltage generated by the AC bridge a signal representing the relative position of the first substrate and the second substrate in the detection direction.

2. The position detection device of claim 1, in which the variable capacitors constituted by the long capacitor electrodes are located in opposite arms of the AC bridge.

3. The position detection device of claim 1, in which the long capacitor electrodes are twice as long as the short capacitor electrodes in the detection direction.

4. The position detection device of claim 3, in which:

the capacitor electrodes each have a length in the detection direction; and the long capacitor electrodes located on the first electrode surface are offset in the detection direction relative to the long capacitor electrodes located on the second electrode surface by a distance approximately equal to the length of the short capacitor electrodes.

5. The position detection device of claim 1, additionally comprising:

a guard electrode underlying each capacitor electrode, the guard electrode having a wider exterior dimension than that of the capacitor electrode;

an isolation layer sandwiched between the capacitor electrodes and the guard electrodes; and coupling circuit means for coupling a voltage from the capacitor electrode to the underlying guard electrode.

6. The position detection device of claim 5, in which the coupling circuit means includes a buffer amplifier having a high input impedance.

7. The position detection device of claim 1, in which the detection circuit means includes:

means for generating a first signal having a value proportional to a maximum value of the output voltage generated by the AC bridge;

means for generating a second signal having a value proportional to a maximum value of a drive signal applied to the AC bridge; and means for dividing the first signal by the second signal to generate the signal representing the relative position of the first substrate and the second substrate in the detection direction.

8. The position detection device of claim 1, in which the detection circuit means includes:

means for multiplying the output voltage generated at the AC bridge by a drive signal applied to the AC bridge to generate an intermediate output signal; and low-pass filter means for removing a drive signal component from the intermediate output signal to generate the signal representing the relative position of the first substrate and the second substrate in the detection direction.

9. The position detection device of claim 1, additionally comprising:

a sealed region between the first electrode surface and the second electrode surface; and gas filling the sealed region.

10. The position detection device of claim 9, in which the gas includes one of nitrogen and helium.

11. The position detection device of claim 1, additionally comprising:

an actuator for effecting relative, substantially parallel motion between the first electrode surface and the second electrode surface; and position control means for driving the actuator in response to signal representing the relative position between the first substrate and the second substrate.

12. The position detection device of claim 1, in which:

the signal representing the relative position of the first substrate and the second substrate in the detection direction is independent of the relative position of the first substrate and the second substrate in directions orthogonal to the detection direction; and the position detection device additionally comprises an additional AC bridge comprised of additional capacitor electrodes located on the first electrode surface and the second electrode surface, the additional electrodes having lengths and being offset in a second direction, orthogonal to the detection direction, to detect relative position in the second direction.

13. The position detection device of claim 1, in which:

two adjacent ones of the capacitor electrodes located on the first electrode surface are electrically interconnected to provide an output node of the AC bridge; and the position detection device additionally comprises:

a guard electrode located on the first electrode surface and underlying the interconnected capacitor electrodes, an isolation layer sandwiched between the guard electrode and the interconnected capacitor electrodes, and coupling circuit means for coupling a voltage from the output node to the guard electrode.

14. The position detection device of claim 13, in which:

the two electrically-interconnected capacitor electrodes are adjacent one another in a first direction; and the detection device additionally comprises:

an additional guard electrode located on the second electrode surface and underlying two non-interconnected ones of the capacitor electrodes located on the second electrode surface, the two non-interconnected capacitor electrodes being adjacent one another in the first direction, and an additional isolation layer sandwiched between the non-interconnected capacitor electrodes and the additional guard electrode; and the coupling circuit means is additionally for coupling the voltage from the output node to the additional guard electrode.

15. The position detection device of claim 14, in which the position device additionally comprises:

a second guard electrode located on the first electrode surface and underlying two other ones of the capacitor electrodes located on the first electrode surface, the two other ones of the capacitor electrodes being adjacent one another in the first direction and being electrically interconnected to provide an additional output node of the AC bridge; and a second additional guard electrode located on the second electrode surface and underlying two other non-interconnected ones of the capacitor electrodes located on the second electrode surface, the two other non-interconnected ones of the capacitor electrodes being adjacent one another in the first direction; and the coupling circuit means is additionally for coupling the voltage from the additional output node to the second guard electrode and the second additional guard electrode.

16. The position detection device of claim 15, in which the detection circuit means is connected to the coupling circuit means.

17. The position detection device of claim 13, in which the coupling circuit means includes a buffer amplifier having a high input impedance.

18. The position detection device of claim 1, in which the minute gap is less than about 2 $\mu$m wide.

19. The position detection device of claim 1, in which the position detection device constitutes part of a scanning probe microscope.

20. The position detection device of claim 1, in which the position detection device constitutes part of a moving medium-type memory device.

* * * * *